US 9,277,256 B2

United States Patent
Danielsson et al.

(10) Patent No.: US 9,277,256 B2
(45) Date of Patent: Mar. 1, 2016

(54) NODE AND SYSTEM FOR A SYNCHRONOUS NETWORK

(75) Inventors: Magnus Danielsson, Stocksund (SE); Göran Rangne, Skarpnaeck (SE)

(73) Assignee: NET INSIGHT INTELLECTUAL PROPERTY AB, Stockholm (SE)

( * ) Notice: Subject to any disclaimer, the term of this patent is extended or adjusted under 35 U.S.C. 154(b) by 0 days.

(21) Appl. No.: 13/703,049

(22) PCT Filed: Jun. 11, 2010

(86) PCT No.: PCT/EP2010/058210
§ 371 (c)(1),
(2), (4) Date: Dec. 10, 2012

(87) PCT Pub. No.: WO2011/154046
PCT Pub. Date: Dec. 15, 2011

(65) Prior Publication Data
US 2013/0091531 A1    Apr. 11, 2013

(51) Int. Cl.
*H04N 21/236* (2011.01)
*H04N 21/242* (2011.01)
*H04N 21/43* (2011.01)
*H04N 21/8547* (2011.01)
*H04J 3/06* (2006.01)

(52) U.S. Cl.
CPC ............ *H04N 21/242* (2013.01); *H04J 3/0638* (2013.01); *H04J 3/065* (2013.01); *H04J 3/0641* (2013.01); *H04J 3/0667* (2013.01); *H04J 2203/008* (2013.01)

(58) Field of Classification Search
None
See application file for complete search history.

(56) References Cited

U.S. PATENT DOCUMENTS 7,535,931 B1    5/2009  Zampetti et al.
2009/0147806 A1*    6/2009  Brueckheimer .............. 370/503

FOREIGN PATENT DOCUMENTS

WO    WO-00/69106 A1    11/2000
WO    WO-2008/103170 A1    8/2008

OTHER PUBLICATIONS

International Search Report and Written Opinion for PCT/EP2010/058210, mailed Mar. 17, 2011; ISA/EP.
(Continued)

*Primary Examiner* — Brian T Pendleton
*Assistant Examiner* — Jean D Saint Cyr
(74) *Attorney, Agent, or Firm* — Harness, Dickey & Pierce, P.L.C.

(57) ABSTRACT

There is provided a node for facilitating time distribution in communication networks, and more specifically for time synchronization in digital television (DTV) distribution network. The node comprises an interface, a clock for establishing a local time, and a time-locked loop. The interface is configured for interconnecting the node to at least one neighboring node over an isochronous transport link for transmission and reception of repetitive frames comprising time information. The time-locked loop is configured for, based on remote time information received via the interface and local time information from the clock, synchronizing the clock to the clock of one of the at least one neighboring node. This facilitates that the node, or a corresponding synchronous network comprising nodes according to the inventive concept, is rather insensitive to network delays. In this way the requirements on the network infrastructure are reduced. In particular, there is no need for dedicated networks. Further, a synchronous network, a method for the node and a method for a synchronous network is provided.

20 Claims, 6 Drawing Sheets

100

(56) References Cited

OTHER PUBLICATIONS

Decision to Grant A Patent For An Invention issued on Jun. 2, 2014, to the Russian Application No. 2012151959/07(082869), with filed of Nov. 6, 2010, corresponding to the instant U.S. Application, 13 pages, in English and Russian.

* cited by examiner

NODE AND SYSTEM FOR A SYNCHRONOUS NETWORK

CROSS-REFERENCE TO RELATED APPLICATIONS

This application is a 371 U.S. National Stage of International Application No. PCT/EP2010/058210, filed on Jun. 11, 2010. The content of the above application is incorporated herein by reference in its entirety.

FIELD OF THE INVENTION

The invention relates to time distribution in communication networks, and more specifically to time synchronization in digital television (DTV) distribution networks.

BACKGROUND OF THE INVENTION

Distribution of digital terrestrial television (DTT) and mobile digital television (MDTV) frequently utilizes single frequency networks (SFN). In an SFN, several transmitters simultaneously send the same signal over the same frequency channel.

The transmitters in an SFN must be synchronized to send their signals at the same time to avoid interference at the receiving antennas. This is commonly achieved by installing global positioning system (GPS) receivers at all transmitter sites. GPS receivers, however, may be easily intentionally or unintentionally jammed, or fail for other reasons such as equipment failure, and represent an additional cost in the network in terms of equipment and supervision. Further, the military control of the GPS may be an issue.

Also known are techniques for time synchronization of network nodes without utilization of GPS. For instance, the network time protocol (NTP) may be used to synchronize the clocks of network nodes to a master node or a reference clock using time stamps. However, the accuracy of NTP, at least in non-dedicated networks, is far too limited for the purpose of time synchronization in digital television (DTV) distribution networks.

WO 2008/103170 A discloses a method of a network client for extracting a reference frequency carried in the physical layer of a network signal originating from a server, and for using it to stabilize an oscillator of a clock of the client. The method also includes determining a clock correction value based on a server time stamp and a client time stamp.

U.S. Pat. No. 7,535,931 B discloses a two-way time transfer protocol for estimating a time error between the clocks of two network nodes.

SUMMARY OF THE INVENTION

It is an object of the present invention to provide a more efficient alternative to the above techniques and prior art.

More specifically, it is an object of the present invention to provide an improved node for time synchronization in a synchronous network and a method for time synchronization in a synchronous network with integrated Time Transfer functionality, and which is suited for integration in an existing synchronous network.

These and other objects of the present invention are achieved by means of a node for a synchronous network having the features defined in independent claim 1, by means of a method of a node in a synchronous network defined in independent claim 7, by means of a synchronous network according to claim 6, and by means of a method of a synchronous network defined in independent claim 12. Embodiments of the invention are characterized by the dependent claims.

According to a first aspect of the invention, a node for a synchronous network is provided. The node comprises an interface, a clock, and a time-locked loop. The interface is configured for interconnecting the node to at least one neighboring node over an isochronous transport link. The isochronous transport link is configured for transmission and reception of repetitive frames. The repetitive frames comprise time information. The clock is configured for establishing a local time. The time-locked loop is configured for synchronizing the clock to the clock of one of the at least one neighboring node. The synchronization utilizes remote time information received via the interface, local time information, and delay compensation from said remote node.

According to a second aspect of the invention, a synchronous network comprising a plurality of nodes according to the present invention is provided.

According to a third aspect of the invention, a method of a node in a synchronous network is provided. The synchronous network comprises a plurality of nodes. Each node is interconnected via an interface to at least one neighboring node of the plurality of nodes over an isochronous transport link. The isochronous transport link is configured for transmission and reception of repetitive frames. The repetitive frames comprise time information. The method comprises the steps of receiving remote time information, sending local time information, and synchronizing a clock of the node to the clock of the one of the at least one neighboring node. The remote time information is received from one of the at least one neighboring node via the interface. The local time information is sent to the at least one neighboring node via the interface. In the step of synchronizing a clock of the node to the clock of the one of the at least one neighboring node, remote time information and local time information are utilized.

According to a fourth aspect of the invention, a method of a synchronous network is provided. The synchronous network comprises a plurality of nodes. The nodes are interconnected in pairs over isochronous transport links. The method comprises the steps of adapting a network synchronization topology and synchronizing the plurality of nodes to a master node. The step of synchronizing the plurality of nodes to a master node utilizes bidirectional exchange of time information over the isochronous transport links.

The present invention makes use of an understanding that the transport network used to distribute data or contents, e.g., video data in the case of a DTV distribution network, may be used to distribute time information from a master node to all nodes in the network. In that way, a time synchronization of all nodes in the network may be achieved while at the same time eliminating the need for GPS receivers.

According to an embodiment of the invention, the local time information and the remote time information are used in a two-way Time Transfer method. In other words, a Time Transfer method based on bidirectional exchange of time information between neighboring nodes in the network is utilized.

According to an embodiment of the invention, the time-locked loop is configured for synchronizing the clock to the clock of one of the at least one neighboring node. The synchronization utilizes a time difference calculated from the remote time information and the local time information. To this end, the clock of a network node which is to be synchronized to the clock of a neighboring node, referred to as the source node, is phase-locked to the time difference between the clocks of the two nodes. The time difference between the nodes may be calculated according to a two-way Time Transfer method. By phase-locking the clock of a node to the time difference, a time-locked loop is achieved. The embodiments of the present invention described hereinabove are advantageous since they facilitate a system which is rather insensitive to network delays. In that way the requirements on the network infrastructure are reduced. In particular, there is no need for dedicated networks.

According to an embodiment of the invention, the interface is further configured for selecting one of the at least one neighboring node as a source for the remote time information. The selection is performed according to a synchronization topology of the synchronous network. Thus, if a network node is connected to several neighboring nodes, any one of the neighboring nodes may be chosen as the source node for synchronizing the clock of the node. The source node can either be predetermined, e.g., by configuring the node during network roll-out, or may be chosen dynamically. The source may, e.g., be chosen based on the current status of communication links and network nodes, or based on measurements performed on achieved synchronization stability. The source node may be chosen according to a network synchronization topology conveyed by a synchronization protocol.

According to an embodiment of the invention, the synchronous network is a Dynamic Synchronous Transfer Mode (DTM) network. DTM networks are based on time division multiplexing and designed to provide a guaranteed quality of service (QoS), e.g., for streaming video, but may also be used for packet based services. All nodes of a DTM network are synchronized with respect to frequency and relative phase. Embodiments of the invention may also employ other synchronous networks, such as SDH/SONET or synchronous Ethernet.

According to an embodiment of the invention, a synchronous network is provided. The synchronous network comprises a plurality of nodes. The nodes are interconnected in pairs over isochronous transport links. The nodes are configured for adapting a network synchronization topology for synchronizing the plurality of nodes to a master node. The synchronization is performed by bidirectional exchange of time information over the isochronous transport links. In other words, in a network according to an embodiment of the invention, every node may be synchronized to maintain the same absolute phase, which phase is dictated by a master node of the network. The master node may, e.g., be controlled by a reference clock.

The synchronization of the network nodes is achieved using a two-way Time Transfer method such that a source node transfers its local time to its neighboring nodes, which neighboring nodes return their respective local time. A time difference between the source node and the respective neighboring nodes may then be calculated and be used to compensate the clocks of the neighboring nodes such that their respective local time is the same as the local time of the source node. This amounts to maintaining the same absolute phase at the neighboring nodes as the source node. Once a neighboring node is time-locked to its source node, it may in turn distribute its local time to its neighboring nodes such that the neighboring nodes may time-lock to the source node. The process may continue until all nodes in the network have acquired the same absolute phase, i.e., the same local time, as the master node. A network according to an embodiment of the invention may comprise more than one master node to achieve redundancy. If the present master node fails, or a communication link connecting the present master node to the rest of the network fails, a different master may be assigned and the network synchronization topology is adapted for distributing the time of the new master node to the other nodes in the network.

According to an embodiment of the method for a synchronized network, the method further comprises to in an individual node time multiplex time information from a plurality of nodes being interconnected with the individual node, and subsequently synchronize the time multiplexed time information to the master node in that individual node.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
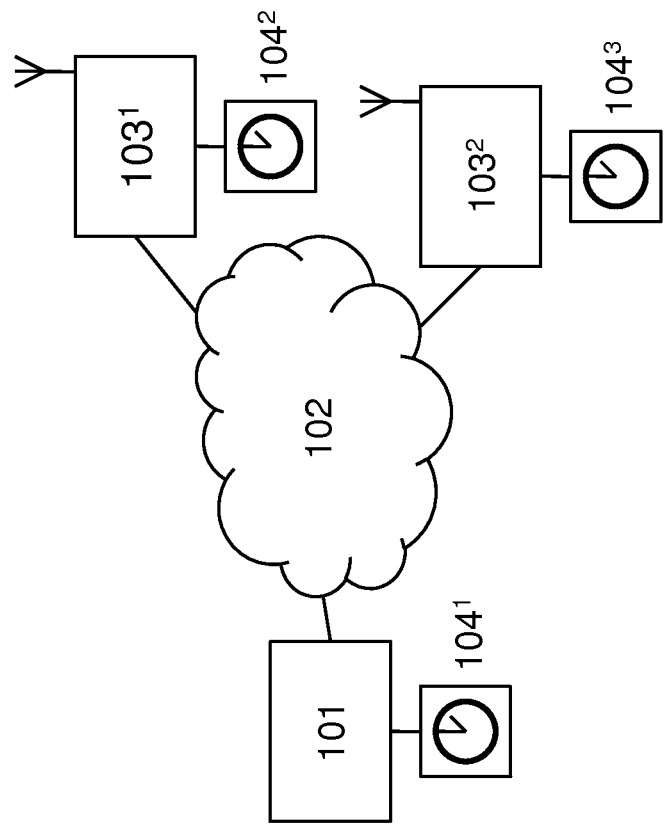
FIG. 1 shows an SFN for DTV distribution using GPS synchronization.

FIG. 1 shows a conventional DTV distribution network 100 for SFN transmission using GPS synchronization. At the headend site 101, program streams from various input channels may be received and multiplexed into suitable transport streams, e.g., MPEG transport streams in DVB-ASI format (Digital Video Broadcasting—Asynchronous Serial Interface). Timing information retrieved from a GPS receiver 104[1] is inserted in to the transport stream.

The transport streams are transmitted through the transport network 102 which provides multicast connections from the headend site 101 to all transmitter sites 103. The transport network 102 may, e.g., comprise optical fiber or microwave links.

At the transmitter sites 103, the propagation time through the transport network 102 may be compensated by comparing the inserted timing information with a local time reference provided by GPS receivers 104 which the transmitter sites 103 are equipped with. By comparing the received timing information with the local time, an additional delay for synchronization of SFN transmission may be calculated.

The timing information may, e.g., be provided by the GPS receivers 104 to the headend site 101 and the transmitter sites 103 using both a 10 MHz frequency reference and a Pulse Per Second (PPS) time reference. The PPS time reference may be divided into 100 ns steps provided by the cycles of the 10 MHz frequency reference. This is used to time stamp the video transport stream in the head end site 101. The time stamp is embedded into the transport stream and allows the transmitter sites 103 to synchronize the signal with the locally available GPS signal such that the transmitters will transmit the signal at almost the same time. The time stamping of the video stream is typically performed in an SFN Adapter.

Figure 2:
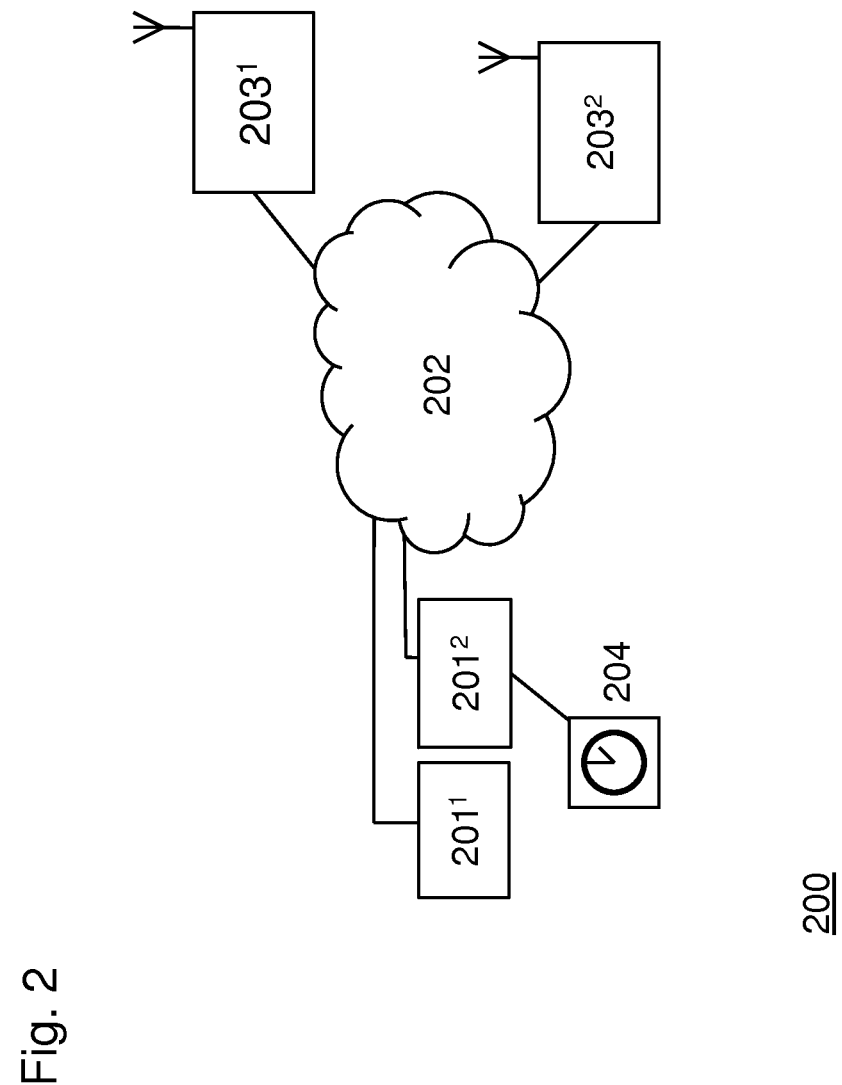
FIG. 2 shows an SFN for DTV distribution using Time Transfer synchronization, according to an embodiment of the invention.

FIG. 2 shows a DTV distribution network 200 according to an embodiment of the invention. As in a conventional distribution network 100, discussed with reference to FIG. 1, program streams received from various input channels may be multiplexed into suitable transport streams, e.g., MPEG transport streams in DVB-ASI format, at the headend site 201, together with timing information retrieved from a GPS receiver 204.

The transport streams are transmitted through the transport network 202 which provides multicast connections from the headend site 201 to all transmitter sites 203, i.e. nodes in the network. The transport network 202 may, e.g., comprise optical fiber or microwave links.

In contrast to a conventional DTV distribution network 100, the distribution network 200 shown in FIG. 2 does not utilize GPS receivers at the transmitter sites 203. Instead, the nodes of the distribution network 200, i.e., the headend site 201 and the transmitter sites 203, are synchronized by exchanging time information over the transport network 202.

With a DTV distribution network 200 according to an embodiment of the invention, distribution of time information for the purpose of synchronizing all network nodes is accomplished over the same transport network 202 which carries the video signals. At the headend site 201, the same time reference signals as in a conventional DTV distribution network 100 are used, which is provided by the reference clock 204 in the form of a GPS receiver 204 or any other suitable reference clock 204. Note that the headend site 201 and the reference clock 204 are not necessarily arranged at the same location. To illustrate that the time stamp for the video signal is not restricted to having the reference clock 204 by its side, the head end site 201 is here divided into two nodes, 201[1] and 201[2]. Node 201[1] provides timestamps for the video signals in the network, and node 201[2] provides the reference clock for synchronizing all network nodes, including node 201[1]. In an alternative embodiment the head end site 201 is a single node providing both timestamps for the video signals, and the time reference from the reference clock 204 for synchronizing all network nodes. In an alternative embodiment several headend nodes may exist for global or local distribution over network 202 to all or a subset of the transmitter nodes 203. The time synchronization information is distributed through the transport network 202, and at the transmitter sites 203 the same synchronization information is provided to the SFN transmitter as is provided by a GPS receiver 104 in a conventional distribution network 100.

A DTV distribution network 200 according to an embodiment of the invention may, e.g., be based on a Dynamic Synchronous Transfer Mode (DTM) network as standardized by the European Telecommunications Standards Institute (ETSI). DTM is designed to provide a guaranteed quality of service (QoS), e.g., for streaming video and audio, but can also be used for packet-based services. The transport mechanism of DTM is based on time division multiplexing and is in this sense similar to SDH/SONET, albeit more flexible and adapted to other types of traffic and applications. The signaling system on the other hand could be compared to what is available in packet-based technologies such as Asynchronous Transfer Mode (ATM) and Internet Protocol (IP).

Figure 3:
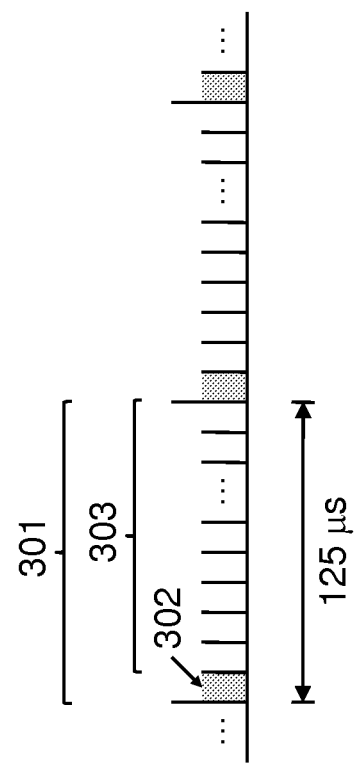
FIG. 3 illustrates a DTM frame.

As is illustrated in FIG. 3, in DTM transport the link capacity is divided into fixed size frames 301 of 125 microseconds (μs) duration, which are further divided into a number of 64-bit time slots. The number of time slots per frame is dependent on the bit rate of the link. Slots can be used either for network internal signaling, i.e., as control slots 302, or for user traffic, i.e., as data slots 303. As each slot is repeated 8000 times per second, the transport capacity of a slot is 512 kbps.

Figure 4:
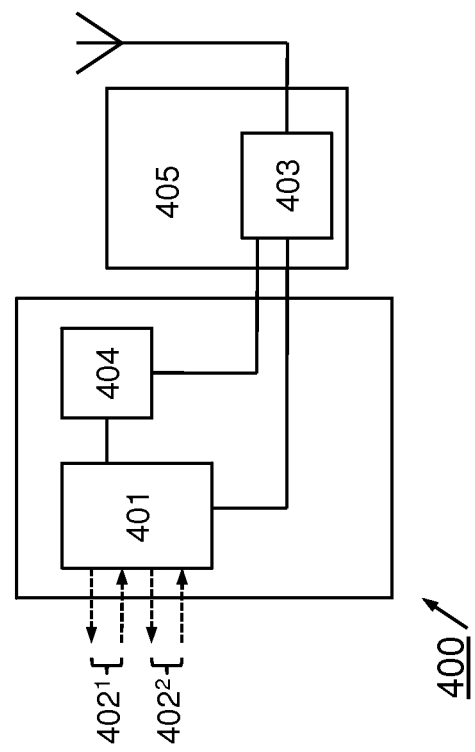
FIG. 4 shows a network node, in accordance with an embodiment of the invention.

In FIG. 4 a node 400 for a DTV distribution network in accordance with an embodiment of the invention is illustrated. Note that node 400 corresponds to a node 203 as described above. Node 400 comprises a network interface 401, for connecting the node to at least one neighboring node and for sending and receiving data over a pair of unidirectional transport links 402. The transport links may, e.g., be DTM links. Node 400 is further associated with a transmitter 405 for transmitting synchronized streams, thus the transmitter 405 comprises a synchronization unit 403 for synchronizing the transmission of a transport stream with a time reference received from the node 400. The node 400 provides the working signal to be transmitted in the form of a ASI-signal, 10 MHz, and a PPS time reference, containing information about the time and frequency by which the working signal is to be transmitted, to the synchronization unit 403 in the transmitter 405. The timing interface, which comprises a synchronization unit 404, regenerates the timing in the form of 10 MHz and PPS such that convenient interfacing to the transmitter 405 and synchronizer 403 is achieved. In addition the TV signal transport stream is provided over the interface 405 such as ASI and Ethernet. The transmitter 405 synchronizes the transport stream using the timing signals prior to modulation, amplification and transmission. Further, the time reference in node 400 is provided by the local clock, i.e. the synchronization unit 404, synchronized to a reference clock of the DTV distribution network. The local clock 404 communicates with interface 401 for exchanging, i.e., sending and receiving, time information with at last one neighboring node connected through node 400 over a transport link 402.

Multiple interfaces such as represented by links 402[1] and 402[2] may be time multiplexed in interface 401 prior to being sent to the centralized phase measurement in clock 404. This represents the fourth aspect of the invention, in that it allows for a simple interface 401 and thus lower implementation complexity when extending the synchronous transport system to include Time Transfer. The synchronous signal reoccurring with the nominal period of 125 μs and having low jitter allows for a time-multiplexing among the interfaces and a single central measurement of the high resolution fractional measure.

Figure 5:
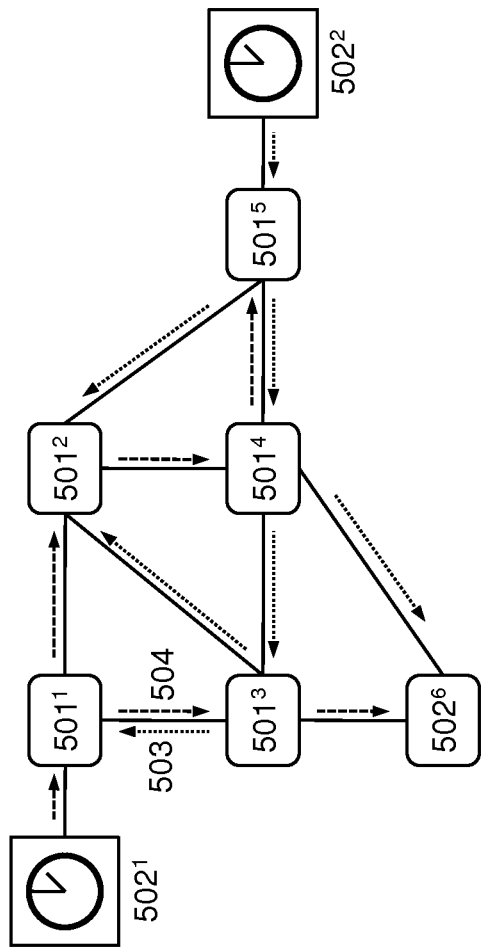
FIG. 5 shows a network synchronization topology, in accordance with an embodiment of the invention.

In FIG. 5, synchronization of nodes in a DTV distribution network 500 is illustrated. The network 500 comprises a plurality of nodes 501. Some of the nodes, e.g., nodes 501[1] and 501[5], are equipped with reference clocks 502, e.g., GPS receivers, and may serve as master nodes for time distribution throughout the network 500, i.e., for providing time information the other nodes of the network 500. Typically, one master node, e.g., node 501[1], is used to synchronize all nodes of the network, and other nodes provided with reference clocks, such as node 501[5] in FIG. 5, serve as backup nodes. Optionally, each of the nodes 501[1] and 501[5] may serve as a master node for a part of the network.

The dotted 503 and dashed 504 lines illustrate possible synchronization topologies for distributing timing information from the master nodes 501[1] and/or 501[5] to the other nodes of the network 500. If network 500 is a DTM network, the synchronization topology is automatically determined by the DTM synchronization protocol (DSYP). In case of failure of a synchronization path, the DSYP will recalculate the synchronization tree enabling automatic synchronization restoration and avoiding synchronization loops in the network.

In a DTV distribution network according to an embodiment of the invention, a two-way Time Transfer method is employed for synchronizing all nodes of the network to a reference clock. Using two-way Time Transfer, a source node transfers its local time to its the neighboring nodes. The neighboring nodes return their time to the source node. The nodes may then calculate a time difference which may be used for synchronizing to the clock of the source node. This process is repeated until all nodes in the network operate on the same time. For instance, with reference to FIG. 5, node $502^2$ may synchronize its clock with the clock of node $501^1$, which is controlled by a reference clock $502^1$. Then, node $501^4$ may synchronize with node $501^2$, and so forth.

Two neighboring nodes according to an embodiment of the invention may synchronize their respective clocks by employing bidirectional exchange of time information according to a two-way Time Transfer scheme. This is achieved by transmitting time information to the neighboring nodes, and by receiving time information from the neighboring nodes. If the DTV distribution network is a DTM network, time information may be transmitted over a dedicated slot, i.e., a Time Transfer channel, e.g., slot 302 in FIG. 3. The Time Transfer channel may be used for transmission of time stamps, time difference measurements, correction factors, and various statistics between nodes involved in two-way Time Transfer.

In an embodiment according to the present invention, instead of performing a separate routing of the synchronization in the network, which typically is a 8 kHz frequency distribution, and a separate routing of the Time Transfer distribution in the network, the routing of both distributions are at all times strictly restricted to a common routing. In addition to the double functionality, separate routing demands for a complex fault management. The common routing may require minor adjustments in the routing algorithm for optimized performance. However, the adjustments for the common routing is associated with a much less demanding operation than the fault management for separate routing. Further, common routing of the distributions provides an increased lucidity for a selected routing.

The Time Transfer channels are arranged such that they provide the same information in both directions. Thus, the information is independent of the selected synchronization/Time Transfer routing in the network. As a node is selected as source node for a neighboring node, it has all information, such as time stamps, time difference measurements, correction factors, and various statistics between nodes involved in two-way Time Transfer available. All nodes are thus automatically potential source nodes for their neighboring nodes. Thereby, the actual synchronization/Time Transfer routing in the network is based on local selections at each node. This enables hitless re-routing of Time Transfer as decided by dynamic synchronization routing.

Figure 6:
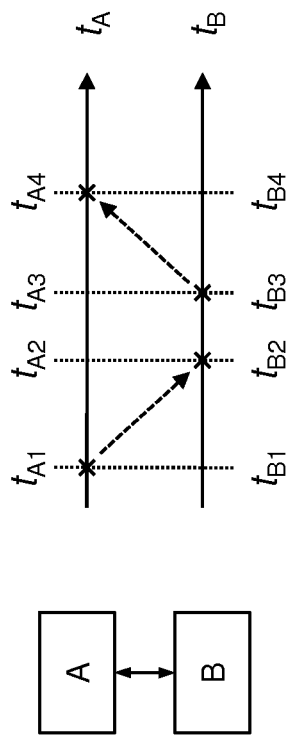
FIG. 6 illustrates two-way Time Transfer, in accordance with an embodiment of the invention.

The main principle of two-way Time Transfer is illustrated in FIG. 6. Time is to be distributed from a source node A, with a local time scale $t_A$, to a slave node B, with a local time scale $t_B$. The source node may retrieve its time scale from a reference clock, e.g., a GPS receiver, or it may be synchronized to a master node of the network. Through the DSYP protocol, node B is configured for receiving time information from node A.

It may be further realized that time stamp interchange may be overlapped ($t_{B1} < t_{B3} < t_{B2}$) or reversed order ($t_{B3} < t_{B1} < t_{B2}$) without changing the functionality as long as the exchange is relatively close in time. Further, node A may insert its local time $t_{A1}$ into a stream which is transmitted to node B and reaches node B at local time $t_{B2}$.

A pseudo-range observation $p_{AB} = t_{B2} - t_{A1}$ is formed in the receiver at node B. The local clock of node A is then $t_{A2}$. In the same way, node B may send a time stamp to node A at local times $t_{B3}$ and $t_{A3}$, respectively, which is received at node A at local times $t_{A4}$ and $t_{B4}$, respectively. A pseudo-range observation $p_{BA} = t_{A4} - t_{B3}$ is formed in the receiver at node A. Further, the following relations apply:

$$\Delta T = t_A - t_B$$

$$t_{A4} = t_{B4} + \Delta T$$

$$t_{A2} = t_{B2} + \Delta T$$

$$t_{A2} = t_{A1} + d_{AB,link}$$

$$t_{B4} = t_{B3} + d_{BA,link},$$

where $d_{AB,link}$ and $d_{BA,link}$ are the transmission delays from node A to node B, and vice versa, respectively. The estimated time error $\Delta TE$ between the nodes A and B can then be expressed as:

$$\Delta TE = \frac{p_{BA,link} - p_{AB,link}}{2} = \Delta T + \frac{d_{BA,link} - d_{AB,link}}{2},$$

while the Round Trip Time (RTT) can be expressed as:

$$RTT = d_{BA,link} + d_{AB,link} = p_{BA,link} + p_{AB,link}.$$

The two-way Time Transfer is based on bidirectional exchange of time information between a pair of interfaces. In a basic mode of operation, the propagation delays over the link, $d_{AB,link}$ and $d_{BA,link}$, respectively, may be assumed to be symmetric and may be calculated from the measured round trip time (RTT), which is the sum of the transmission delay of the link connections nodes A and B, $d_{AB,link}$ and $d_{BA,link}$, according to:

$$d_{AB,link} = d_{BA,link} = \frac{RTT}{2}$$

In case of asymmetric transmission delays, i.e., $d_{AB,link} \neq d_{BA,link}$, a calibration constant $c_{asym}$ may be used to take the measured asymmetry into account:

$$d_{AB,link} = RTT \times c_{asym} \text{ and } d_{BA,link} = RTT \times (1 - c_{asym}),$$

where $0 < c_{asym} < 1$, and $c_{asym} = 0.5$ for symmetric transmission delays. The determination of the calibration constant $c_{asym}$ requires knowledge of the round trip time RTT and the asymmetry error $\Delta E$ which is known when the link is operating and both nodes receive correct time through other time sources than the link to be calibrated. The asymmetry error $\Delta E$ is formed from the $\Delta TE$ expression under the assumption that $t_A = t_B$ in which case we get:

$$\Delta E = \frac{p_{BA,link} - p_{AB,link}}{2} = \frac{d_{BA,link} - d_{AB,link}}{2}$$

Since the sum of $d_{AB,link}$ and $d_{BA,link}$ is known as RTT, $d_{AB,link}$ and $d_{BA,link}$ can be calculated as:

$$d_{AB,link} = RTT/2 - \Delta E \text{ and } d_{BA,link} = RTT/2 + \Delta E$$

Given this value, the $c_{asym}$ value is easy to calculate form either of the $d_{AB,link}$ or $d_{BA,link}$ values to become:

$$c_{asym} = d_{AB,link}/RTT = 1 - d_{BA,link}/RTT = \frac{1}{2} - \Delta E/RTT$$

The input and output delays of the interface, $d_{A,out}$ and $d_{B,in}$, respectively, are used in expressing the transmission delays as:

$$d_{AB} = d_{A,out} + d_{AB,link} + d_{B,in},$$

where $d_{AB,link}$ is the transmission delay of the link connections nodes A and B. A corresponding relation applies to $d_{BA}$. The compensated values $d_{AB,link}$ and $d_{BA,link}$ can be calculated from $d_{AB}$ and $d_{BA}$ as:

$$d_{AB,link} = d_{AB} - d_{A,out} - d_{B,in} \text{ and } d_{BA,link} = d_{BA} - d_{B,out} - d_{A,in}.$$

The observed pseudo-ranges thus becomes after compensation:

$$p_{AB,link} = p_{AB} - d_{A,out} - d_{B,in} \text{ and } p_{BA,link} = p_{BA} - d_{B,out} - d_{A,in}.$$

As described above with reference to FIG. 3, fixed size frames of 125 μs duration are used in the DTM transport. Thus, the local time scale of a node may be established by dividing the time scale using a monotonously increasing integer and a value representing the fraction of a 125 μs periodic clock, which may represent a time-scale such as that of international atomic time (TAI) or other suitable time-scale. For node A, e.g., the local time scale can be expressed as:

$$t_A = (n_A + \text{frac}_A) \times 125 \text{ μs}.$$

A corresponding relation applies to the local time of node B:

$$t_B = (n_B + \text{frac}_B) \times 125 \text{ μs}.$$

The time stamps taken at the receiver side will consist of the integer fractional value $n_A$ and $n_B$ as well as the fractional resolution values $\text{frac}_A$ and $\text{frac}_B$ to form a high resolution continuous time scale. The use of the frame start on the transmitting side occurs at $\text{frac}_A=0$, so no explicit fractional time needs to be transferred between the nodes. The equipment delay from the node frame start to the frame start on the connector of the equipment is contained in the output delay $d_{A,out}$ and $d_{B,out}$ for node A and B respectively. Similarly the delay from the input connector to the actual fine resolution measurement of fractional values is contained in the measurements allow for high resolution and low jitter values compared to time-stamping of packet-based messages as being done in previous art (such as NTP).

Further, the pseudo-range observations $p_{AB}$ and $p_{BA}$ are then in fractional form expressed as:

$$p_{AB} = (n_{B2} + \text{frac}_{B2} - n_{A1}) \times 125 \text{ μs}$$

$$p_{BA} = (n_{A4} + \text{frac}_{A4} - n_{B3}) \times 125 \text{ μs}$$

The calculated time error ΔTE would require the node to shift its frequency such that the time error becomes zero. The major part of ΔTE, i.e. multiples of 125 μs, may be adjusted by a coarse adjustment of the local clock 404. The remaining part of ΔTE could either force the phase of the local clock to become time-aligned such that it operates in an absolute time mode. An alternative approach would be to accept the remaining time error as the offset factor TE0 (by initiating it with ΔTE when achieving time-lock), and operate the Time Locked Loop on the relative time error TER=ΔTE−TE0. The TE0 for the node needs to be transmitted along with the time from the node, such that any receiver of time may correct for the remote node TE0. The complete relative time error becomes TER=ΔTE−TE0$_L$+TE0$_R$, where TE0$_L$ and TE0$_R$ are the offset factors for the local node and the remote node, respectively.

In a conventional DTM network, the DTM equipment clock (DEC) tracks the 8 kHz synchronization timing received on the incoming interfaces, as selected by the DSYP. In a DTV network using two-way Time Transfer, the phase measurement of the DEC phase-locked loop now needs to include the time difference between the local and the remote node in order to resolve the 125 μs ambiguity between the nodes. This turns the functionality of the DEC into a time locked loop (TLL).

The person skilled in the art realizes that the present invention by no means is limited to the embodiments described above. On the contrary, many modifications and variations are possible within the scope of the appended claims. For example, embodiments of the invention may be based on other network technologies than DTM.

The invention claimed is:

1. A first node for a synchronous network, the first node comprising:
    an interface configured to (i) interconnect the first node to a second node over an isochronous transport link and (ii) transmit and receive repetitive frames comprising user data to and from the second node,
    a first local clock that establishes a first local time of the first node, and
    a time-locked loop configured to synchronize the first local time of the first local clock to a second local time of the second node established by a second local clock,
    wherein the time-locked loop is configured to synchronize the first local time to the second local time by phase locking the first local clock to a time difference between the first local clock and the second local clock,
    wherein the time difference is determined by receiving a first timestamp of the second local clock,
    providing a first time difference between (i) the first local time at reception of the first timestamp and (ii) the received first timestamp,
    transmitting a second timestamp of the first local time to the second node, and
    receiving from the second node a second time difference between (i) the second local time at reception of the second timestamp and (ii) the second timestamp, and
    wherein time information of the first node and the second node is exchanged between the first and second nodes by way of the repetitive frames.

2. The first node according to claim 1, wherein the interface is further configured to select, according to a synchronization topology of the synchronous network, the second node as a source.

3. The first node according to claim 1, wherein the synchronous network is a dynamic synchronous transfer mode, DTM, network.

4. A synchronous network comprising a plurality of nodes according to claim 1, the plurality of nodes being interconnected over isochronous transport links and being configured to adapt a network synchronization topology for synchronizing the plurality of nodes to a master node by bidirectional exchange of time information over the isochronous transport links.

5. A method performed by a first node in a synchronous network, the synchronous network including a plurality of nodes, each node being interconnected via an interface to at least one neighboring second node of the plurality of nodes over an isochronous transport link for transmission and reception of repetitive frames comprising user data, the method comprising:
    using an interface of the first node, transmitting and receiving to and from the second node repetitive frames comprising user data, establishing a first local time of the first node using a first local clock, synchronizing the first local time to a time established by a second local clock of the second node, wherein the synchronizing comprises phase locking the first local clock to a time difference between the first local clock and the second local clock, and exchanging, via the interface, time information of the first node and the second node by way of the repetitive frames, wherein the time difference is determined by receiving a first timestamp of the second local clock, providing a first time difference between (i) the first local time at reception of the first timestamp and (ii) the received first timestamp, transmitting a second timestamp of the first local time to the second node, and receiving from the second node a second time difference between (i) the second local time at reception of the second timestamp and (ii) the second timestamp.

6. The method according to claim 5, further comprising the step of:

selecting from the plurality of nodes, according to a synchronization topology of the synchronous network, the second node as a source for the remote time information.

7. The method according to claim 5, wherein the synchronous network is a dynamic synchronous transfer mode, DTM, network.

8. A method for a synchronous network including a plurality of nodes, the plurality of nodes being interconnected over isochronous transport links, the method comprising: adapting a network synchronization topology, and synchronizing local clocks of the plurality of nodes to a local clock of a master node by bidirectional exchange of time information by way of repetitive frames comprising user data over the isochronous transport links, wherein the time information includes time differences between times kept by the local clocks, and for each node of the plurality of nodes, using an interface of the node, transmitting and receiving to and from a neighboring node repetitive frames comprising user data, establishing a first local time of the node using a first local clock, synchronizing the first local time to a time established by a second local clock of the neighboring node, wherein the synchronizing comprises phase locking the first local clock to a time difference between the first local clock and the second local clock, and exchanging, via the interface, time information of the node and the neighboring node by way of the repetitive frames, wherein the time difference is determined by receiving a first timestamp of the second local clock, providing a first time difference between (i) the first local time at reception of the first timestamp and (ii) the received first timestamp, transmitting a second timestamp of the first local time to the neighboring node, and receiving from the neighboring node a second time difference between (i) the second local time at reception of the second timestamp and (ii) the second timestamp.

9. The method according to claim 8, further comprising, in an individual node:

time multiplexing time information from a plurality of nodes being interconnected with the individual node; and subsequently synchronizing the time multiplexed time information to the master node in the individual node.

10. The first node according to claim 1, wherein the first local clock for establishing the first local time is initially locked using a phase locked loop to attain frequency and stable phase, and wherein the first local clock for establishing the first local time is initialized by a remote clock through re-assignment.

11. A synchronous network comprising:

a first node; and a second node that is connected to the first node over an isochronous transport link for transmission and reception of repetitive frames comprising user data, wherein:

the first node establishes a first local time using a first local clock;

the second node establishes a second local time using a second local clock;

the first node synchronizes the first local time to the second local time by phase locking the first local clock to a time difference between the first local clock and the second local clock;

the time difference is determined by receiving a first timestamp of the second local clock, providing a first time difference between (i) the first local time at reception of the first timestamp and (ii) the received first timestamp, transmitting a second timestamp of the first local time to the second node, and receiving from the second node a second time difference between (i) the second local time at reception of the second timestamp and (ii) the second timestamp; and time information of the first node and the second node is exchanged between the first and second nodes by way of the repetitive frames.

12. A synchronous network, comprising:

the first and second nodes of claim 1, and a third node, the third node comprising:

an interface configured to (i) interconnect the third node to the second node over an isochronous transport link and (ii) transmit and receive repetitive frames comprising user data to and from the second node, a third local clock that establishes a third local time, and a time-locked loop configured to (i) measure a third time difference between the third local time and the second local time, (ii) receive from the second node a fourth time difference between the second local time and the third local time, and (iii) based on the third and fourth time differences, synchronize the third local clock to the second local clock, wherein the third and fourth time differences are exchanged between the second and third nodes by way of the repetitive frames.

13. The first node according to claim 1, wherein the time difference between the first local clock and the second local clock is based on a first time difference as seen by the first node (p_AB) and a second time difference as seen by the second node (p_BA).

14. The first node according to claim 1, wherein the respective time information of the first node and the second node comprises at least one of a timestamp and a time difference.

15. The method according to claim 5, wherein the time difference between the first local clock and the second local clock is based on a first time difference as seen by the first node (p_AB) and a second time difference as seen by the second node (p_BA).

16. The method according to claim 5, wherein the respective time information of the first node and the second node comprises at least one of a timestamp and a time difference.

17. The method according to claim 8, wherein, for each node of the plurality of nodes, the time difference between the first local clock and the second local clock is based on a first time difference as seen by the node (p_AB) and a second time difference as seen by the neighboring node (p_BA).

18. The method according to claim 8, wherein, for each node of the plurality of nodes, the respective time information of the node and the neighboring node comprises at least one of a timestamp and a time difference.

19. The synchronous network according to claim 11, wherein the time difference between the first local clock and the second local clock is based on a first time difference as seen by the first node (p_AB) and a second time difference as seen by the second node (p_BA).

20. The synchronous network according to claim 11, wherein the respective time information of the first node and the second node comprises at least one of a timestamp and a time difference.

\* \* \* \* \*